(12) United States Patent
Horikawa et al.

(10) Patent No.: US 10,752,544 B2
(45) Date of Patent: Aug. 25, 2020

(54) RESIN COMPOSITE MODULE FOR VEHICLE AND PRODUCTION METHOD THEREFOR

(71) Applicant: KOITO MANUFACTURING CO., LTD., Tokyo (JP)

(72) Inventors: Nobuyuki Horikawa, Shizuoka (JP); Yasuaki Tsutsumi, Shizuoka (JP); Masaru Kaneko, Shizuoka (JP); Masayuki Kobayashi, Shizuoka (JP)

(73) Assignee: KOITO MANUFACTURING CO., LTD., Minato-ku, Tokyo (JP)

( * ) Notice: Subject to any disclaimer, the term of this patent is extended or adjusted under 35 U.S.C. 154(b) by 0 days.

(21) Appl. No.: 16/130,583

(22) Filed: Sep. 13, 2018

(65) Prior Publication Data
US 2019/0084876 A1 Mar. 21, 2019

(30) Foreign Application Priority Data
Sep. 21, 2017 (JP) .................. 2017-181452

(51) Int. Cl.
*C03C 23/00* (2006.01)
*C03C 17/30* (2006.01)
(Continued)

(52) U.S. Cl.
CPC .............. *C03C 23/002* (2013.01); *B60J 1/18* (2013.01); *B62D 25/08* (2013.01); *B62D 29/043* (2013.01);
(Continued)

(58) Field of Classification Search
CPC ... C03C 23/002; C03C 2217/78; C03C 17/30; B60J 1/18; B29C 35/0805;
(Continued)

(56) References Cited

U.S. PATENT DOCUMENTS 7,250,611 B2 * 7/2007 Aguirre ................ A61C 19/004
250/365
2007/0048531 A1 * 3/2007 Nagaoka .................... C08J 7/04
428/447

FOREIGN PATENT DOCUMENTS

JP 2014-008810 A 1/2014
JP 2014-008837 A 1/2014

OTHER PUBLICATIONS

Machine Translation of JP 2014-008837 (Year: 2014).*
Hayes et al. "A New Hardcoat for Automotive Plastics" PCI Dec. 17, 2007. (Year: 2007).*

* cited by examiner

*Primary Examiner* — Robert S Walters, Jr.
(74) *Attorney, Agent, or Firm* — Sughrue Mion, PLLC

(57) ABSTRACT

There is provided a production method of a resin composite module for a vehicle, which includes a resin module substrate, and a silicone-based polymer hard coat which is formed on the resin module substrate. The method includes forming the hard coat by coating a silicone-based polymer onto the resin module substrate, and radiating an ultraviolet ray onto at least a part of a surface of the hard coat such that a hardness thereof becomes 0.8 GPa or more as evaluated by a nanoindentation method. The radiating the ultraviolet ray uses a light source unit which includes a light source and emits an ultraviolet ray having a wavelength of 360 nm or less from an emission surface thereof and radiates the ultraviolet ray onto the surface of the hard coat while a distance from the emission surface to the surface of the hard coat is 10 mm or less.

2 Claims, 6 Drawing Sheets

(51) Int. Cl.
*B60J 1/18* (2006.01)
*B62D 29/04* (2006.01)
*B62D 25/08* (2006.01)
B29C 35/08 (2006.01)
B29L 31/30 (2006.01)
B05D 7/02 (2006.01)
B05D 3/06 (2006.01)

(52) U.S. Cl.
CPC ............. *C03C 17/30* (2013.01); *B05D 3/067* (2013.01); *B05D 7/02* (2013.01); *B29C 35/0805* (2013.01); *B29C 2035/0827* (2013.01); *B29L 2031/3052* (2013.01); *C03C 2217/78* (2013.01)

(58) Field of Classification Search
CPC ..... B29C 2035/0827; B29L 2031/3052; B62D 29/043; B62D 25/08; B05D 7/02; B05D 3/067
See application file for complete search history.

RESIN COMPOSITE MODULE FOR VEHICLE AND PRODUCTION METHOD THEREFOR

CROSS REFERENCE TO RELATED APPLICATIONS

The present application claims the benefit of priority of Japanese Patent Application No. 2017-181452, filed Sep. 21, 2017, the content of which is incorporated herein by reference.

TECHNICAL FIELD

Aspects of the present invention relate to a resin composite module for a vehicle, and a production method therefor.

BACKGROUND

JP-A-2014-8810, JP-A-2014-8837 or the like discloses a rear module integrally including a vehicle lamp, a vehicle rear window or the like.

SUMMARY

The inventors of the present invention have examined to implement the rear module proposed in JP-A-2014-8810 and JP-A-2014-8837. In the rear module, a plurality of parts are necessary to be covered with a smooth curved surface, and appearance designability is particularly required, so that the rear module is required to be molded into a complicated three-dimensional shape. Therefore, it is advantageous to form a rear module with resin, which has a degree of freedom in molding higher than that of glass. However, when the rear module is molded with resin only, a portion corresponding to a window portion may be easily scratched.

Accordingly, an aspect of the present invention provides a resin composite module for a vehicle which has designability and scratch resistance and a production method therefor.

According to an aspect of the present invention, there is provided a production method of a resin composite module for a vehicle, the resin composite module including a vehicle window and having a surface with a three-dimensional shape, wherein the resin composite module includes:
 a resin module substrate; and
 a silicone-based polymer hard coat which is formed on the resin module substrate.
 the method includes:
 forming the hard coat by coating a silicone-based polymer onto the resin module substrate; and
 radiating an ultraviolet ray onto at least a part of a surface of the hard coat such that a hardness thereof becomes 0.8 GPa or more as evaluated by a nanoindentation method.

The radiating the ultraviolet ray uses a light source unit which includes at least one light source and is configured to emit an ultraviolet ray having a wavelength of 360 nm or less from an emission surface thereof and radiates the ultraviolet ray onto the surface of the hard coat while a distance from the emission surface to the surface of the hard coat is 10 mm or less.

According to another aspect of the present invention, there is provided a resin composite module for a vehicle, the resin composite module including a vehicle window and having a surface with a three-dimensional shape. The resin composite module includes:
 a resin module substrate; and
 a silicone-based polymer hard coat which is formed on the resin module substrate.

At least a part of a surface of the hard coat is radiated by an ultraviolet ray having a wavelength of 360 nm or less, and a hardness thereof is 0.8 GPa or more as evaluated by a nanoindentation method.

According to the above configuration, a resin composite module for a vehicle which has designability and scratch resistance, and a production method therefor can be provided.

DETAILED DESCRIPTION

Figure 1:
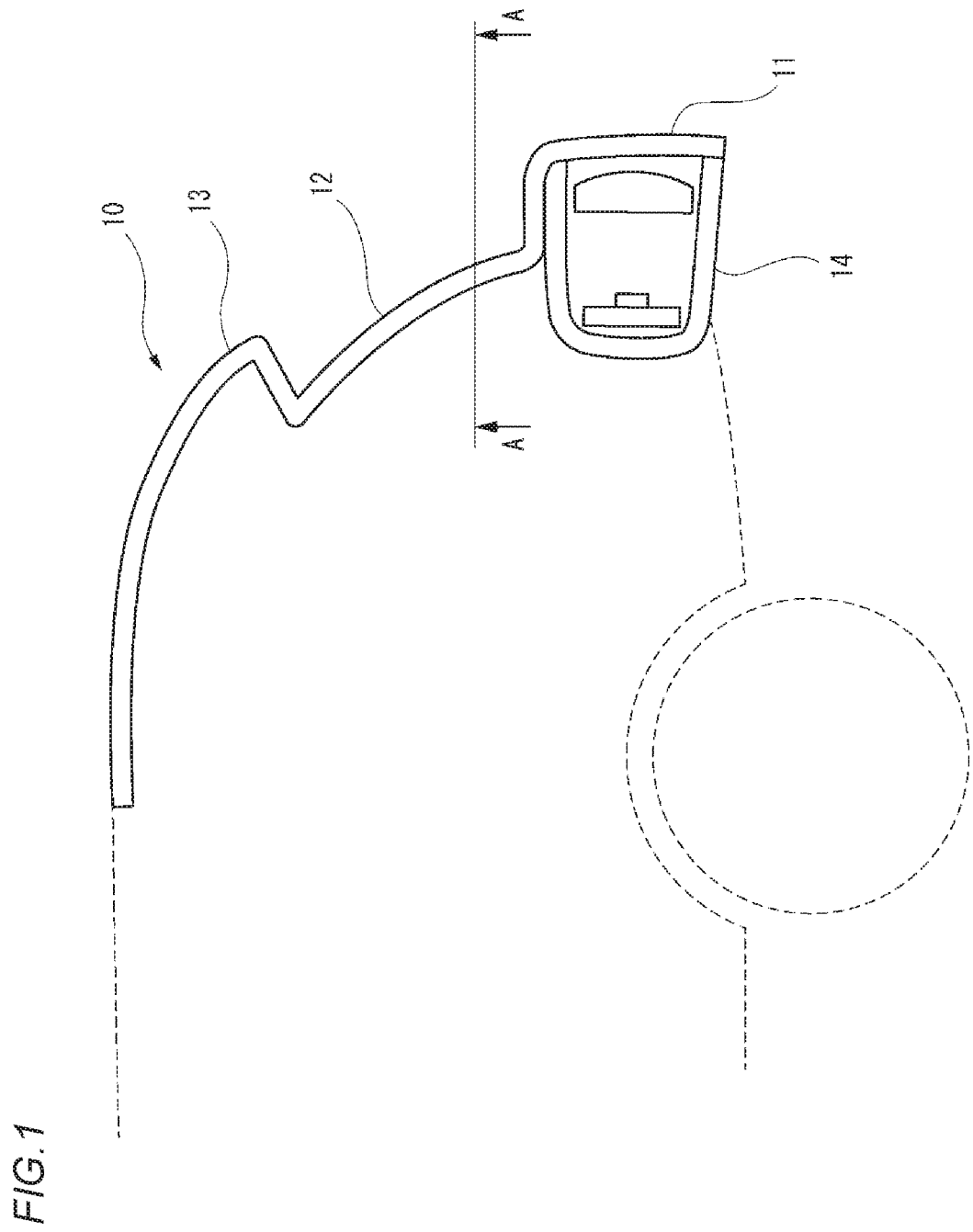
FIG. 1 is a cross sectional view of a vehicle including a resin composite module for a vehicle according to embodiments.

Hereinafter, a resin composite module for a vehicle and a production method therefor according to embodiments of the present invention will be described in detail with reference to the drawings. Dimensions of each member shown in the drawings may be different from actual dimensions of each member for ease and convenience of explanation.

First Embodiment

A first embodiment of the present invention will be described. A resin composite module according to the first embodiment has a three-dimensional shape. FIG. 1 is a cross sectional view of a vehicle including a rear module 10 according to the first embodiment of the present invention. The rear module 10 integrally includes an outer lens 11 of a rear combination lamp 14 and a rear window 12. A part of the rear module 10 also configures a spoiler. In the rear module 10, a portion around the rear combination lamp 14 usually has a complicated concave-convex shape.

The rear module 10 includes a substrate formed of a polycarbonate resin, an acrylic resin primer layer formed on the substrate, and a silicone-based polymer hard coat formed on the primer layer. In the rear window of a vehicle, it is required to have scratch resistance of a transparent portion for ensuring visibility for a long term. Therefore, in order to improve the scratch resistance, the hard coat is provided on the substrate.

When a silicone-based polymer is radiated by an ultraviolet ray having a wavelength of 360 nm or less, a polymer bond (a Si—C bond) is cleaved, an oxygen atom and a silicon atom are re-bonded, and thus a hard surface is formed, with silicon dioxide as a main component. By setting the wavelength of the ultraviolet ray to be 360 nm or less, the Si—C bond can be cleaved. In a surface 13 of the hard coat of the rear module 10, the surface 13 corresponding to the outer lens 11 and the rear window 12 is modified by radiating an ultraviolet ray having a wavelength of 360 nm or less. The modified surface 13 has a hardness of 0.8 GPa or more as evaluated by a nanoindentation method, which is one of methods for evaluating the hardness of a thin film. This evaluation is performed using a Nano Indenter G200 (indentation depth: 50 nm) manufactured by Agilent Technologies, Inc.

Next, a method for producing the rear module 10 according to the first embodiment will be described. The production method includes: a first step of forming the primer layer on the substrate and forming a hard coat layer on the primer layer; and a second step of radiating the ultraviolet ray onto at least a part of the surface 13 of the hard coat layer.

In the first step, the substrate is formed by a polycarbonate resin, the primer layer is formed by an acrylic resin, and the hard coat is formed by a silicone-based polymer. The primer layer is formed by coating the acrylic resin on the substrate by a wet method such as a dip coating method, performing drying at room temperature for a predetermined time, and then performing curing and drying by heating for a predetermined time. The hard coat is formed by coating the silicone-based polymer on the primer layer by, for example, a dip coating method, performing drying at room temperature for a predetermined time, and then performing curing and drying by heating for a predetermined time.

Figure 2:
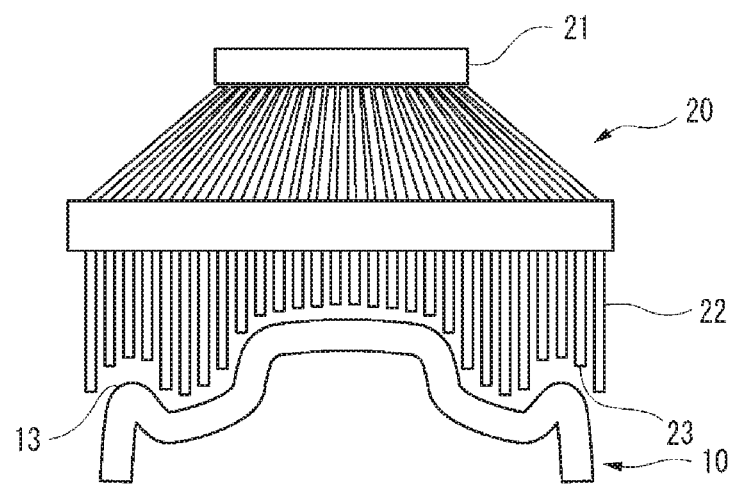
FIG. 2 is a schematic diagram showing a method for producing a resin composite module for a vehicle according to a first embodiment.

Next, the second step will be described. FIG. 2 is a schematic diagram showing a state where the surface 13 of the hard coat is radiated by the ultraviolet ray. FIG. 2 shows a section of the rear module 10 of FIG. 1 along a line A-A.

The ultraviolet ray is radiated in the second step using a light source unit 20 including a light source 21, and a plurality of optical fibers 22 which guide the light emitted from the light source 21. The light source unit 20 radiates the ultraviolet ray onto the surface 13 from end surfaces 23 of the plurality of optical fibers 22. The light source 21 is not particularly limited as long as it is a light source radiating an ultraviolet ray having a wavelength of 360 nm or less. In this embodiment, a $Xe_2$ excimer lamp having a wavelength of 172 nm is used. Any fiber can be used as the optical fiber 22 as long as the ultraviolet ray can be guided from the light source 21 to the end surfaces 23 while reducing attenuation of the ultraviolet ray.

Figure 3:
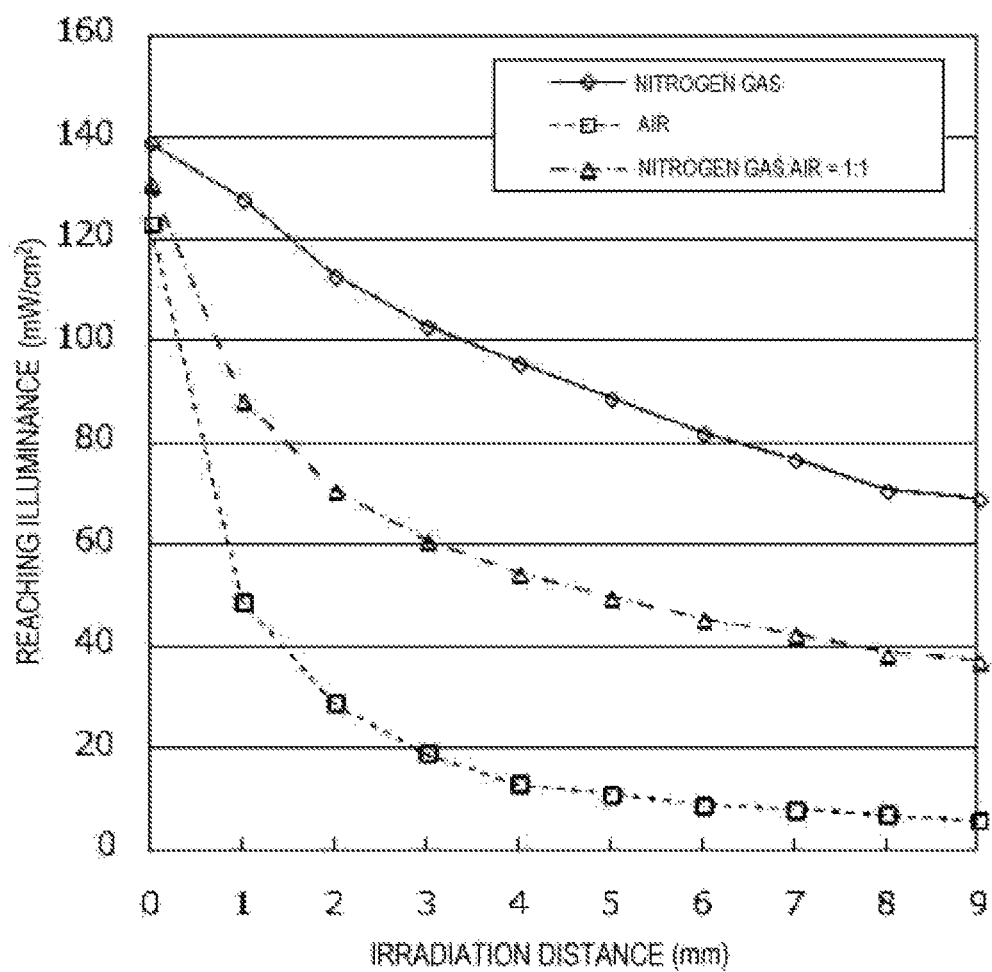
FIG. 3 is a graph showing attenuation in a reaching illuminance of an ultraviolet ray with respect to a radiation distance.

As a distance between a radiation object and an emission surface increases, the illuminance of an ultraviolet ray having a wavelength of 200 nm or less attenuates. FIG. 3 is a graph showing a relationship between a radiation distance from an emission end of an ultraviolet ray of 172 nm to the object and a reaching illuminance to the object, in air, a nitrogen gas atmosphere, and a mixed atmosphere of nitrogen gas and air. From FIG. 3, it can be confirmed that in any gas atmosphere, the smaller the radiation distance is, the lager the reaching illuminance is. Since the reaching illuminance is lowered when the radiation distance is longer than 10 nm, the ultraviolet radiation is performed within a distance of 10 mm or less in this embodiment. In addition, if the radiation distance is within a distance of 2 mm or less, attenuation in the reaching illuminance can be further reduced, which is advantageous.

An ultraviolet ray having a wavelength of 200 nm or less may be absorbed by oxygen gas in air. As shown in FIG. 3, in an atmosphere in which a concentration of nitrogen gas which does not absorb the ultraviolet ray is high, the attenuation in illuminance is reduced. From a viewpoint of production efficiency, it is advantageous to radiate the ultraviolet ray in an atmosphere of inert gas which absorbs few ultraviolet ray, such as nitrogen gas. Specifically, it is advantageous that a concentration of oxygen in a space between the emission surface of the ultraviolet ray and the emission object is 0.1% to 10%. In this embodiment, a space from the end surfaces 23 to the surface 13 is set to be a nitrogen gas atmosphere. As a method for setting the space from the end surfaces 23 to the surface 13 to be a nitrogen gas atmosphere, a method for blowing nitrogen gas to the space, a method for using a nitrogen gas chamber, or the like can be adopted.

Returning back to FIG. 2, a relationship of the light source unit 20 and the rear module 10 in the second step is described. The plurality of optical fibers 22 of the light source unit 20 are arranged such that a distance from the end surfaces 23 to the surface 13 of the hard coat of the rear module 10 is 10 mm or less, and the end surfaces 23 are arranged along the surface 13 having a complicated concave-convex shape (a three-dimensional shape) when the ultraviolet ray is radiated.

When the ultraviolet ray is radiated onto the surface 13, the silicone-based polymer of the surface 13 is modified. The ultraviolet ray is radiated such that at least the surface 13 corresponding to the outer lens 11 and the rear window 12 has a hardness of 0.8 GPa or more as evaluated by the nanoindentation method. Although the hardness is not particularly limited, according to this embodiment, a desired hardness can be obtained with radiation for about 2 minutes. Accordingly, the rear module 10 having a three-dimensional shape, in which at least a part of the surface 13 has a hardness of 0.8 GPa or more as evaluated by the nanoindentation method, can be obtained.

As the silicone-based polymer, an oligomer, which is obtained by condensation of silane "KBM-13" manufactured by Shin-Etsu Chemical Co., Ltd., is coated. Regarding the surface of the silicone-based polymer before and after photo-modification by ultraviolet radiation, the hardness measured by the nanoindentation method and the haze value (JIS K7136) measured after a Taber abrasion test (JIS K7204) are shown in Table 1. The hardness measured by the nanoindentation method and the haze value (JIS K7136) measured after the Taper abrasion test (JIS K7204) of a glass film derived from hexamethyldisilazane are also shown. In the Taber abrasion test, the rotation number is 1000.

TABLE 1

| Sample | Hardness (GPa) | Haze value (%) after Taber abrasion test |
| --- | --- | --- |
| Silicone-based polymer before modification | 0.345 | 4.6 |
| Silicone-based polymer after modification | 0.91 | 1.9 |
| Glass | 2.07 | 0.8 |

Figure 4:
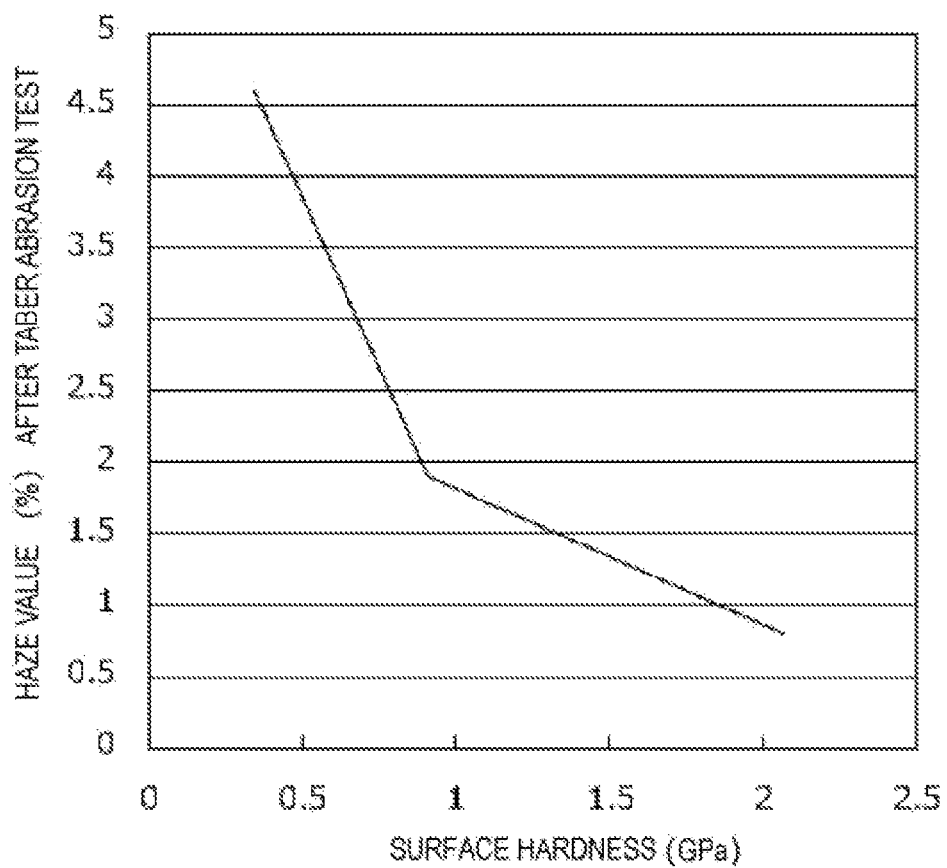
FIG. 4 is a graph showing a relationship between a hardness of a surface of a sample in Table 1 and a haze value after a Taber abrasion test.

As scratch resistance of a member which can be used in a visual area of an automobile, it may be required that a difference between a haze value at an early stage and a haze value after the Taber abrasion test, in which the rotation number is 1000, is 2% or less. FIG. 4 is a graph showing a relationship between a hardness of a surface of a sample in Table 1 and a haze value after the Taber abrasion test. From FIG. 4, it can be confirmed that when the surface of the sample has a hardness of 0.8 GPa or more as evaluated by the nanoindentation method, the haze value after the Taber abrasion test almost satisfies the required standards. It can also be confirmed that when the surface has a hardness of 0.9 GPa or more, the haze value after the Taber abrasion test satisfies the required standards.

Figure 5:
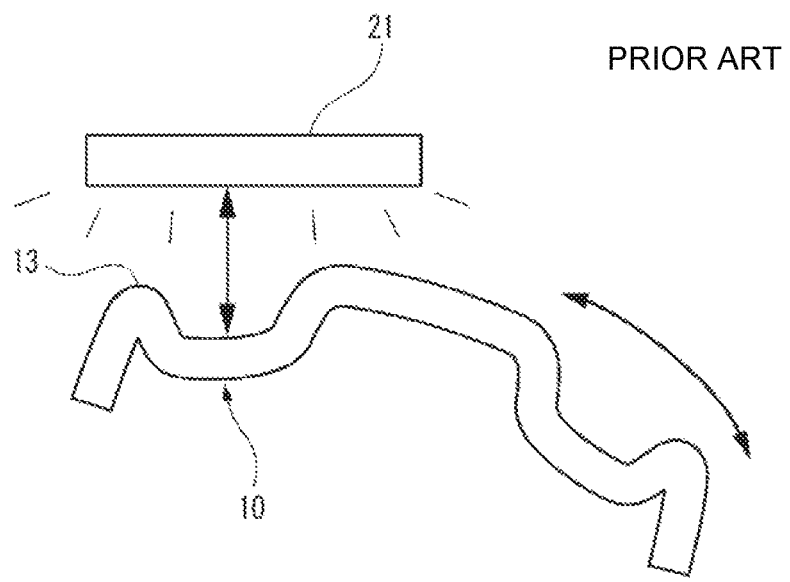
FIG. 5 is a schematic diagram showing a related-art method for producing a resin composite module for a vehicle.

FIG. 5 is a schematic diagram showing a state where the rear module 10 having a three-dimensional shape is radiated by the ultraviolet ray by a related-art method using a long light source 21 such as a fluorescent lamp. When a resin is used instead of glass, the module can be formed in a complicated shape as compared with the case of glass. However, as shown in FIG. 3, as the radiation distance increases, the illuminance of the ultraviolet ray attenuates. Therefore, in the related-art method, it is difficult to surface-modify a concave-convex portion of the module by radiating the ultraviolet ray onto the surface 13 of the module having a three-dimensional shape and having a large and complicated concave-convex portion.

According to the first embodiment of the present invention, since the three-dimensional shape of the rear module 10 is configured by using a resin having moldability higher than that of glass, it is easy to achieve the rear module 10 having high designability. In addition, since the hardness of the surface 13 having a three-dimensional shape is 0.8 GPa or more as evaluated by the nanoindentation method, high scratch resistance can be achieved. Further, since the plurality of thin optical fibers 22 are arranged along the complicated concave-convex portion of the rear module 10 having a three-dimensional shape, the ultraviolet ray can be guided onto the surface 13 of the rear module 10 without large attenuation, and the surface 13 can be hardened easily and effectively. Therefore, a rear module 10 having designability and scratch resistance can be provided.

Second Embodiment

Figure 6:
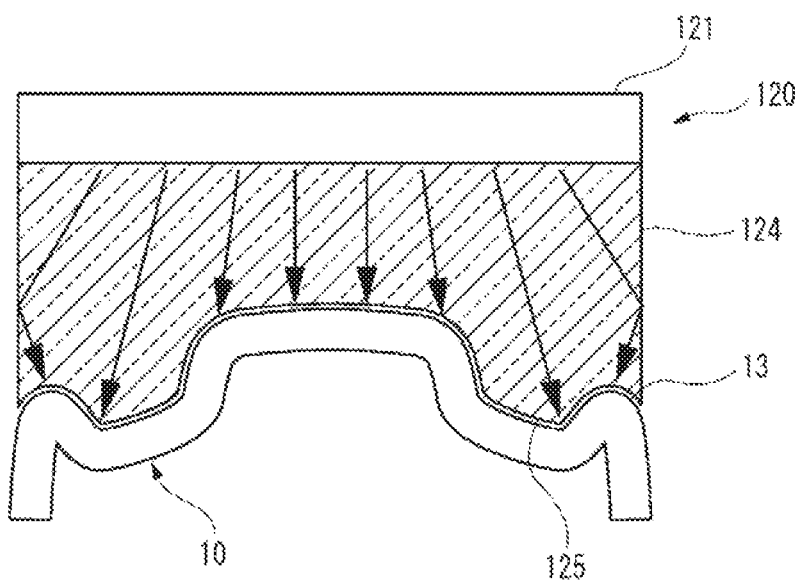
FIG. 6 is a schematic diagram showing a method for producing a resin composite module for a vehicle according to a second embodiment.

Next, a second embodiment of the present invention will be described. FIG. 6 is a schematic diagram showing a state where the surface 13 of the hard coat is radiated by the ultraviolet ray in the second embodiment. This embodiment is similar to the first embodiment except for a light source unit 120. The light source unit 120 includes a light source 121, and a lens part 124 which guides the light emitted from the light source 121 to the surface 13 from the light source 121. The lens part 124 has an emission surface 125 having a shape corresponding to the surface 13 of the hard coat. The light source unit 120 radiates the ultraviolet ray having a wavelength of 360 nm or less from the emission surface 125 of the lens part 124 onto the surface 13. As the light source 121, the light source described in the first embodiment can be used. The lens part 124 is not particularly limited as long as it can reduce attenuation of the ultraviolet ray and guide the ultraviolet ray from the light source 121 to the emission surface 125, and quartz glass or the like can be used.

As shown in FIG. 6, the lens part 124 of the light source unit 120 is disposed such that a distance from the emission surface 125 to the surface 13 of the hard coat is 10 mm or less when the ultraviolet ray is radiated. The emission surface 125 is disposed to match with the complicated concave-convex shape of the surface 13. By radiating the ultraviolet ray as shown in FIG. 6, the rear module 10 having a three-dimensional shape, in which at least a part of the surface 13 has a hardness of 0.8 GPa or more as evaluated by the nanoindentation method, can be obtained.

According to the second embodiment of the present invention, since the three-dimensional shape of the rear module 10 is configured by using a resin having moldability higher than that of glass, it is easy to achieve the rear module 10 having high designability. Further, since the hardness of the surface 13 having a three-dimensional shape is 0.8 GPa or more as evaluated by the nanoindentation method, high scratch resistance can be achieved. In addition, since the lens part 124 corresponding to the complicated concave-convex portion of the rear module 10 having a three-dimensional shape is used, the ultraviolet ray can be guided onto the surface 13 without attenuation, and the surface 13 can be hardened easily and effectively. Therefore, the rear module 10 having designability and scratch resistance can be provided.

Third Embodiment

Figure 7:
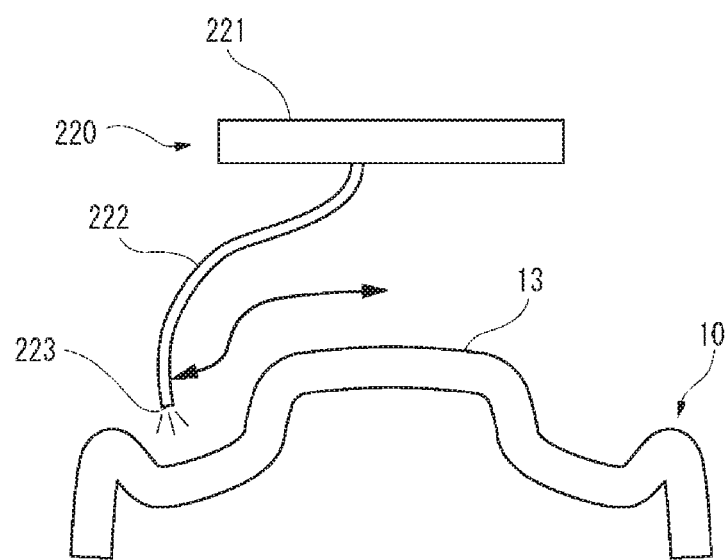
FIG. 7 is a schematic diagram showing a method for producing a resin composite module for a vehicle according to a third embodiment.

A third embodiment of the present invention will be described. FIG. 7 is a schematic diagram showing a state where the surface 13 of the hard coat is radiated by the ultraviolet ray in the third embodiment. This embodiment is similar to the first embodiment except for a light source unit 220. The light source unit 220 includes a light source 221, and an optical fiber 222 which guides the light emitted from the light source 221 to the surface 13 from the light source 221. The light source unit 220 radiates the ultraviolet ray onto the surface 13 from an end surface 223 of the optical fiber 222. As the light source 221 and the optical fiber 222, the ones described in the first embodiment can be used.

As shown in FIG. 7, when the ultraviolet ray is radiated, the optical fiber 222 of the light source unit 220 is disposed such that a distance from the end surface 223 to the surface 13 is 10 mm or less. Then, the optical fiber 222 is moved along the concave-convex shape of the surface 13 such that at least the surface 13 corresponding to the outer lens 11 and the rear window 12 in the surface 13 is modified. By radiating the ultraviolet ray as shown in FIG. 7, the rear module 10 having a three-dimensional shape, in which at least the surface 13 corresponding to the outer lens 11 and the rear window 12 has a hardness of 0.8 GPa or more as evaluated by the nanoindentation method, can be obtained.

According to the third embodiment of the present invention, since the three-dimensional shape of the rear module 10 is configured by using a resin having moldability higher than that of glass, it is easy to achieve a rear module 10 having high designability. Further, since the hardness of the surface 13 having a three-dimensional shape is 0.8 GPa or more as evaluated by the nanoindentation method, high scratch resistance can be achieved. In addition, since the thin optical fiber 222 is moved along the complicated concave-convex portion of the rear module 10 having a three-dimensional shape, the ultraviolet ray is not attenuated, and the surface 13 can be hardened easily and effectively. Therefore, a rear module 10 having designability and scratch resistance can be provided.

Fourth Embodiment

Figure 8:
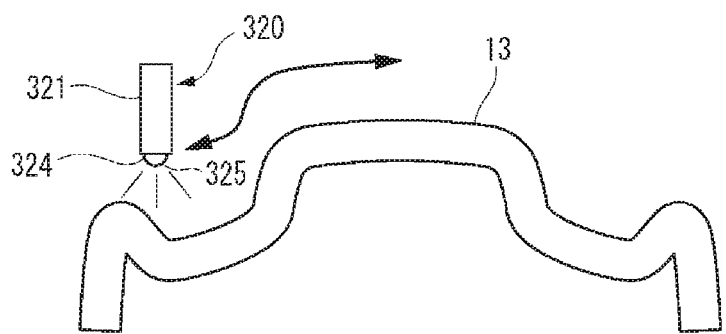
FIG. 8 is a schematic diagram showing a method for producing a resin composite module for a vehicle according to a fourth embodiment.

A fourth embodiment of the present invention will be described. FIG. 8 is a schematic diagram showing a state where the surface 13 of the hard coat is radiated by the ultraviolet ray in the fourth embodiment. This embodiment is similar to the first embodiment except for a light source unit 320. The light source unit 320 includes a light source 321, and a lens part 324 having an emission surface 325. The light source unit 320 is small enough to approach the rear module 10 to a position where a distance from the surface 13 having a three-dimensional-shaped concave portion to the emission surface 325 of the lens part 324 is 10 mm or less. The light source unit 320 radiates the ultraviolet ray onto the surface 13 from the emission surface 325. As the light source 321, the light source described in the first embodiment can be used. The lens part 324 is not particularly limited as long as it can transmit the ultraviolet ray. In addition, the light source unit 320 itself may be the light source mentioned in the first embodiment.

As shown in FIG. 8, the light source unit 320 is disposed such that a distance from the emission surface 325 to the surface 13 of the hard coat is 10 mm or less when the ultraviolet ray is radiated. Then, the light source unit 320 is moved along the concave-convex shape of the surface 13 such that at least the surface 13 corresponding to the outer lens 11 and the rear window 12 in the surface 13 is modified. By radiating the ultraviolet ray shown in FIG. 8, the rear module 10 having a three-dimensional shape, in which at least the surface 13 corresponding to the outer lens 11 and the rear window 12 has a hardness of 0.8 GPa or more as evaluated by the nanoindentation method, can be obtained.

According to the fourth embodiment of the present invention, since the three-dimensional shape of the rear module 10 is configured by using a resin having moldability higher than that of glass, it is easy to achieve a rear module 10 having high designability. Further, since the hardness of the surface 13 having a three-dimensional shape is 0.8 GPa or more as evaluated by the nanoindentation method, high scratch resistance can be achieved, in addition, since the small light source unit 320 is moved along the complicated concave-convex portion of the rear module 10 having a three-dimensional shape, the ultraviolet ray is not attenuated, and the surface 13 can be hardened easily and effectively. Therefore, a rear module 10 having designability and scratch resistance can be provided.

Various Modifications

Although particular embodiments of the present invention have been described above, the technical scope of the present invention should not be limited by the description of this embodiment. It should be appreciated by those skilled in the art that embodiments are merely examples and that various modifications can be made within the scope of the invention described in the claims. The technical scope of the present invention should be determined based on the scope of the invention described in the claims and the scope of equivalents thereof.

In the above embodiments, as the resin composite module, the rear module integrally including the outer lens of the rear combination lamp, and the rear window is described. However, as the resin composite module, other modules may be used, such as a rear module including a rear window, a rear module integrally including an outer lens of a stop lamp and a rear window, a rear module integrally including an outer lens of a high mount stop lamp and a rear window, and a front module integrally including an outer lens of at least one of a head lamp, a turn signal lamp and a daytime running lamp, and a front window.

The outer lens in the above embodiments may be an element which refracts light, or may be an element which allows light to simply pass through. In addition, the lamp unit of the vehicle may be a configuration including only an outer lens without an inner lens.

In the above embodiments, as the substrate of the resin composite module, an example using a polycarbonate resin is described. However, other materials may be used, such as an acrylic resin, a cycloolefin resin and a polystyrene resin.

In the above embodiments, as the primer layer of the resin composite module, an example using an acrylic resin is described. However, other materials may be used, such as a urethane resin.

In the above embodiments, an example using a silicone-based polymer as a surface layer of a three-layered resin composite module is described, but the present invention is not limited thereto. A resin composite module having a single layer excluding the substrate and the primer layer, or having a double-layer structure may be used, or a resin composite module in which the surface layer is partially formed of a silicone-based polymer by two-color molding or the like may also be used.

In the above embodiments, an example using the $Xe_2$ excimer lamp having a wavelength of 172 nm as the light source of the ultraviolet ray is described. However, other light sources may be used, such as an $Ar_2$ excimer lamp, a $Kr_2$ excimer lamp, an $Ar_2$ excimer laser, a $F_2$ excimer laser, an ArF excimer laser, a low pressure mercury lamp, an LED, and a semiconductor laser.

In the above embodiments, an example using nitrogen gas as inert gas not absorbing ultraviolet rays is described. However, other gas may be used, such as gas containing at least one of argon, helium, and carbon dioxide,

The invention claimed is:

1. A production method of a resin composite module for a vehicle, the resin composite module including a vehicle window and having a surface with a three-dimensional shape, wherein the resin composite module includes:
   a resin module substrate; and
   a silicone-based polymer hard coat which is formed on the resin module substrate, the method comprising:
   forming the hard coat by coating a silicone-based polymer onto the resin module substrate; and
   radiating an ultraviolet ray onto at least a part of a surface of the hard coat such that a hardness thereof becomes 0.8 GPa or more as evaluated by a nanoindentation method,
   wherein the radiating the ultraviolet ray uses a light source unit which includes at least one light source configured to emit an ultraviolet ray having a wavelength of 360 nm or less and a plurality of optical fibers configured to transmit the ultraviolet ray, the light source unit is configured to radiate the ultraviolet ray from an emission surface at end surfaces of the plurality of optical fibers and radiates the ultraviolet ray onto the surface of the hard coat while a distance from the emission surface at the output of the light source unit to the surface of the hard coat is 10 mm or less, and
   wherein the plurality of optical fibers are different lengths to conform to a shape of the surface of the hardcoat so that the distance from the emission surface to the surface of the hard coat is 10 mm or less.

2. The method according to claim 1,
   wherein the radiating is performed in an atmosphere where a concentration of oxygen in an ultraviolet radiation region is 0.1% to 10%.

* * * * *